US012641053B2

(12) United States Patent
McGarvey

(10) Patent No.: US 12,641,053 B2
(45) Date of Patent: May 26, 2026

(54) DETERMINING A TOP LEVEL DOMAIN FROM A DOMAIN NAME

(71) Applicant: VERISIGN, INC., Reston, VA (US)

(72) Inventor: Kevin McGarvey, Reston, VA (US)

(73) Assignee: VeriSign, Inc., Reston, VA (US)

( * ) Notice: Subject to any disclaimer, the term of this patent is extended or adjusted under 35 U.S.C. 154(b) by 284 days.

(21) Appl. No.: 15/385,993

(22) Filed: Dec. 21, 2016

(65) Prior Publication Data

US 2018/0173799 A1 Jun. 21, 2018

(51) Int. Cl.
| | |
|---|---|
| *H04L 61/4511* | (2022.01) |
| *G06F 16/22* | (2019.01) |
| *G06F 16/901* | (2019.01) |
| *G06F 16/951* | (2019.01) |
| *H04L 61/4552* | (2022.01) |

(52) U.S. Cl.
CPC ...... *H04L 61/4511* (2022.05); *G06F 16/2255* (2019.01); *G06F 16/9014* (2019.01); *G06F 16/951* (2019.01); *H04L 61/4552* (2022.05)

(58) Field of Classification Search
CPC ........... G06F 17/30864; G06F 17/3033; G06F 16/2255; G06F 16/9014; G06F 16/951; H04L 61/1511; H04L 61/4511; H04L 61/4552
USPC ........ 707/698, 747, E17.052, 709, 711, 722, 707/E17.12, E17.014, 999.01, 999.1
See application file for complete search history.

(56) References Cited

U.S. PATENT DOCUMENTS

| | | | | |
|---|---|---|---|---|
| 5,706,462 A | * | 1/1998 | Matousek | ........... G06F 12/0864 |
| | | | | 711/118 |
| 6,438,555 B1 | * | 8/2002 | Orton | ...................... G06F 16/30 |
| 8,402,250 B1 | * | 3/2013 | Juillard | ................. G06F 16/137 |
| | | | | 711/216 |
| 2002/0042784 A1 | * | 4/2002 | Kerven | ............... G06F 16/3338 |
| | | | | 707/E17.074 |
| 2004/0073707 A1 | | 4/2004 | Dillon | |
| 2004/0267907 A1 | | 12/2004 | Gustafsson | |
| 2012/0110334 A1 | * | 5/2012 | Rossi | ................ H04L 29/12066 |
| | | | | 713/176 |
| 2013/0086677 A1 | * | 4/2013 | Ma | ...................... H04L 63/1483 |
| | | | | 726/22 |

(Continued)

OTHER PUBLICATIONS

Extended European Search Report dated Apr. 25, 2018, European Application No. 17209732.1, pp. 1-8.
Ron Aitchison, "Pro DNS and BIND 10", Jan. 1, 2011, pp. 42-47.

*Primary Examiner* — Md I Uddin
(74) *Attorney, Agent, or Firm* — McCarter & English, LLP; Michael A. Sartori

(57) ABSTRACT
A system includes a processing system of a device including one or more processors. The system also includes a memory system including one or more computer-readable media. The one or more computer-readable media contain instructions that, when executed by the processing system, cause the processing system to perform operations. The operations include reading, at a domain name system (DNS) server, top-level domain (TLD) information from a TLD list. The operations also include sizing data structures for a hash table. The operations also include loading the TLD information into the hash table. The operations also include determining whether a collision constraint is met in the hash table. The operations also include increasing a size of the data structures when the collision constraint is not met.

17 Claims, 6 Drawing Sheets

(56) References Cited

U.S. PATENT DOCUMENTS

| 2014/0025814 | A1* | 1/2014 | Muret | H04L 43/0888 |
| | | | | 709/224 |
| 2016/0357743 | A1* | 12/2016 | Swaminathan | G06F 16/2255 |
| 2017/0041441 | A1* | 2/2017 | Barber | G06F 16/258 |

* cited by examiner

DETERMINING A TOP LEVEL DOMAIN FROM A DOMAIN NAME

BACKGROUND

During the processing of a domain name system ("DNS") query, a name server may first identify the top-level domain ("TLD") of a domain name and access information about the TLD. For example, in the domain name www.example.com, the TLD is com. The TLD information is stored in a hash table. A hash table is a data structure used to implement an associative array, which is a structure than can map keys to values. A hash table uses a hash function to compute an index into an array of buckets, from which the desired value can be found. While the hash table may be more efficient than search trees or other lookup structures, faster systems and methods that improve the hash table lookup would be desirable.

SUMMARY

A system for processing a DNS query is disclosed. The system includes a processing system of a device including one or more processors. The system also includes a memory system including one or more computer-readable media. The one or more computer-readable media contain instructions that, when executed by the processing system, cause the processing system to perform operations. The operations include reading, at a domain name system (DNS) server, top-level domain (TLD) information from a TLD list. The operations also include sizing data structures for a hash table. The operations also include loading the TLD information into the hash table. The operations also include determining whether a collision constraint is met in the hash table. The operations also include increasing a size of the data structures when the collision constraint is not met.

In another embodiment, the system includes a processing system of a device including one or more processors. The system also includes a memory system including one or more computer-readable media. The one or more computer-readable media contain instructions that, when executed by the processing system, cause the processing system to perform operations. The operations include reading, at a domain name system (DNS) server, top-level domain (TLD) information from a TLD list. The operations also include sizing data structures for a hash table. The operations also include loading the TLD information into the hash table. The operations also include determining whether a collision constraint is met in the hash table. The operations also include increasing a size of the data structures when the collision constraint is not met. The operations also include receiving a query from a client for a DNS name after the size of the data structures has been increased. The operations also include looking up a TLD of the DNS name. The operations also include looking up DNS data for the DNS name when the TLD is found. The operations also include processing the DNS data. The operations also include sending a response to the client including the processed DNS data.

In another embodiment, the system includes a processing system of a device including one or more processors. The system also includes a memory system including one or more computer-readable media. The one or more computer-readable media contain instructions that, when executed by the processing system, cause the processing system to perform operations. The operations include computing a hash index in response to a query from a client for a DNS name. The operations also include accessing a hash header indexed by the hash index, and the hash header comprises a signed integer. The operations also include determining whether the signed integer matches a predetermined value. The operations also include accessing a top-level domain (TLD) information object when the signed integer does not match the predetermined value, and the TLD information object is in a TLD information cache. The operations also include determining whether the TLD information object matches a TLD of the DNS name. The operations also include receiving the TLD information object from the TLD information cache when the TLD information object matches the TLD of the DNS name.

BRIEF DESCRIPTION OF THE DRAWINGS

The accompanying drawings, which are incorporated in and constitute a part of this specification, illustrate various embodiments of the present disclosure and together, with the description, serve to explain the principles of the present disclosure. In the drawings.

DETAILED DESCRIPTION

Figure 1:
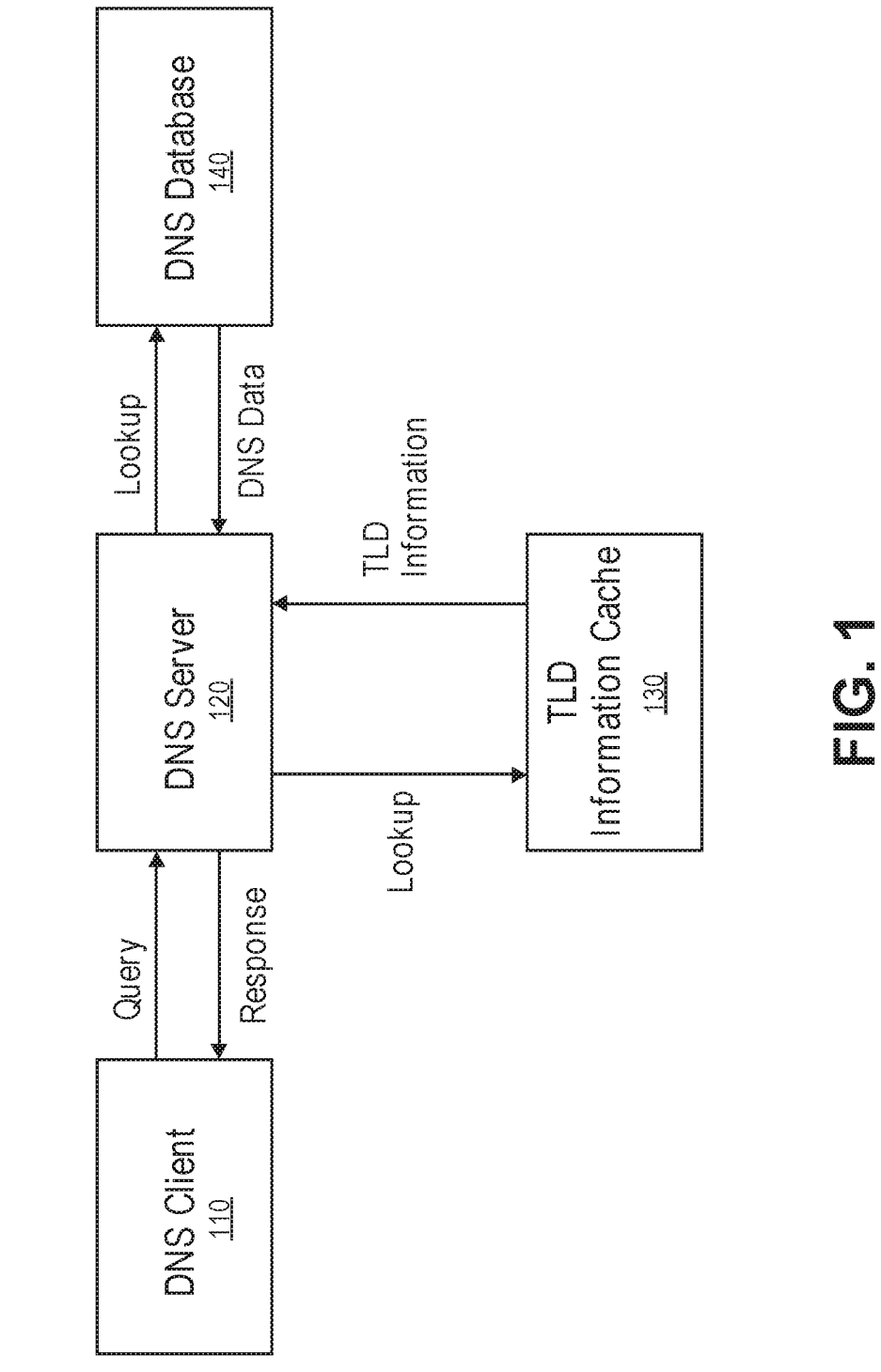
FIG. 1 is a diagram illustrating an example of a system for processing a DNS query, consistent with certain disclosed embodiments.

The following detailed description refers to the accompanying drawings. Wherever convenient, the same reference numbers are used in the drawings and the following description to refer to the same or similar parts. While several examples of embodiments and features of the present disclosure are described herein, modifications, adaptations, and other implementations are possible, without departing from the spirit and scope of the present disclosure. Accordingly, the following detailed description does not limit the present disclosure. Instead, the proper scope of the disclosure is defined by the appended claims.

FIG. 1 is a diagram illustrating an example of a system 100 for processing a domain name system ("DNS") query, consistent with certain disclosed embodiments. The system 100 may include an improved DNS server 120, a top-level domain ("TLD") information cache 130, and a DNS database 140. The DNS server 120 may receive a query from a client 110 and provide the client 110 with a response. The query may request information about a DNS name, known as a "qname." The qname may include a TLD. The TLD is the highest-level domain in the DNS infrastructure. For example, in the domain name www.example.net, the TLD is net.

The response from the DNS server 120 to the client 110 may depend upon whether the DNS server 120 is authoritative for the TLD in the qname. For example, the DNS server 120 may be authoritative for the "com", "net", and "edu" TLDs, but not the "org" TLD. If the DNS server 120 is authoritative for the TLD, the DNS server 120 may generate the response based on the information that it has; otherwise, the DNS server 120 may send a response that refers the client 110 to root DNS servers. This is known as root referral. To determine whether the DNS server 120 is authoritative for the TLD of the qname, the DNS server 120 may look up information about the TLD. To reduce the overhead of these lookups compared to a conventional DNS server that does not interact with a TLD information cache 130, information about the TLDs for which the DNS server 120 is authoritative may be stored in the TLD information cache 130. During the processing of the DNS request, the DNS server 130 may also retrieve information from the DNS database 140 to help satisfy the request.

The response to the client 110 may include information about the DNS name servers that are authoritative for the full qname (e.g., www.example.net). The response information may be included in name server ("NS") records. The NS records for the qname may be in a different TLD than the qname. For example, the NS records for www.example.com are in the "com" TLD. The DNS server 120 processing the query may or may not be authoritative for the TLD of the NS records. If the DNS server 120 is authoritative for the TLD of the NS record, the DNS server 120 may include address records in the response to the client 110 that include the IP addresses for the NS records. The address records may either be of type "A" for IPv4 addresses or "AAAA" for IPv6 addresses. The address records are known as glue records. If the DNS server 120 is not authoritative for the NS record, the DNS server 120 does not include glue records for the NS in the response to the client 110.

To determine whether the DNS server 120 is authoritative for the NS record, the improved DNS server 120 may extract the TLD from the NS name in the NS record, and look up the TLD in the TLD information cache 130.

Figure 2:
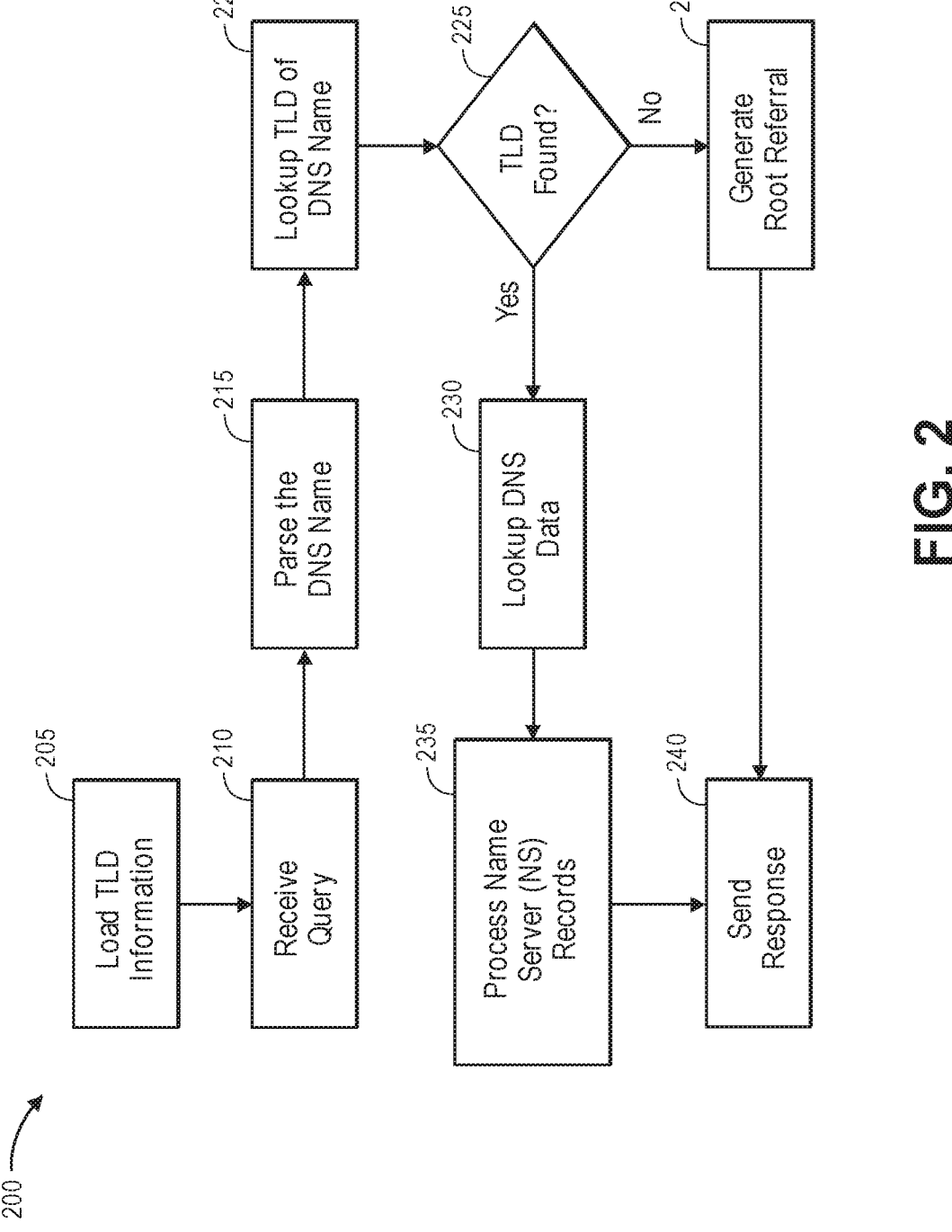
FIG. 2 is a flow diagram illustrating an example of a method for processing a DNS query, consistent with certain disclosed embodiments.

FIG. 2 is a flow diagram 200 illustrating an example of a method for processing a DNS query, consistent with certain disclosed embodiments. One or more steps in the method of FIG. 2 may be performed by the DNS server 120. Prior to processing the DNS query, the DNS server 120 may load TLD information into the TLD information cache 130, as at 205. The TLD information may be or include a list of which TLDs for which the TLD server 120 is authoritative (e.g., the TLD names, such as "com", "net", and "edu"). A more detailed description of step 205 is provided in FIG. 3.

The method may also include receiving a query for a DNS name from the client 110, as at 210. The DNS name may be, for example, www.example.net. The method may also include parsing (e.g., extracting the domains from) the DNS name, as at 215. In this example, the parsing may yield "www", "example", and "net". The method may also include looking up the TLD of the DNS name in the TLD information cache 130, as at 220. In this example, the TLD is "net". A more detailed description of step 220 is provided in FIG. 4.

The method may also include determining whether the TLD is found, as at 225. If the TLD is found (i.e., YES), the DNS server 120 may look up DNS data for the qname, as at 230. The DNS data may be or include NS records. The method may also include processing the DNS data, as at 235. This may include processing the NS records. A more detailed description of step 235 is provided in FIG. 5. Once the NS records have been processed, the method may include sending the response from the DNS server 120 to the client 110, as at 240. The response may include a list of name servers for the query name, a list of addresses of name servers if the DNS server 120 is authoritative, other DNS record types (e.g., CNAME, DNAME, SOA, DNSKEY, RRSIG, etc.), or a combination thereof.

If the TLD is not found at 225 (i.e., NO), the DNS server 120 may generate a root referral. The root referral may include a list of root servers to which the client 110 may send the query. The method may then include sending response from the DNS server 120 to the client 110, as at 240. In this instance, the response may include the list of root servers.

Figure 3:
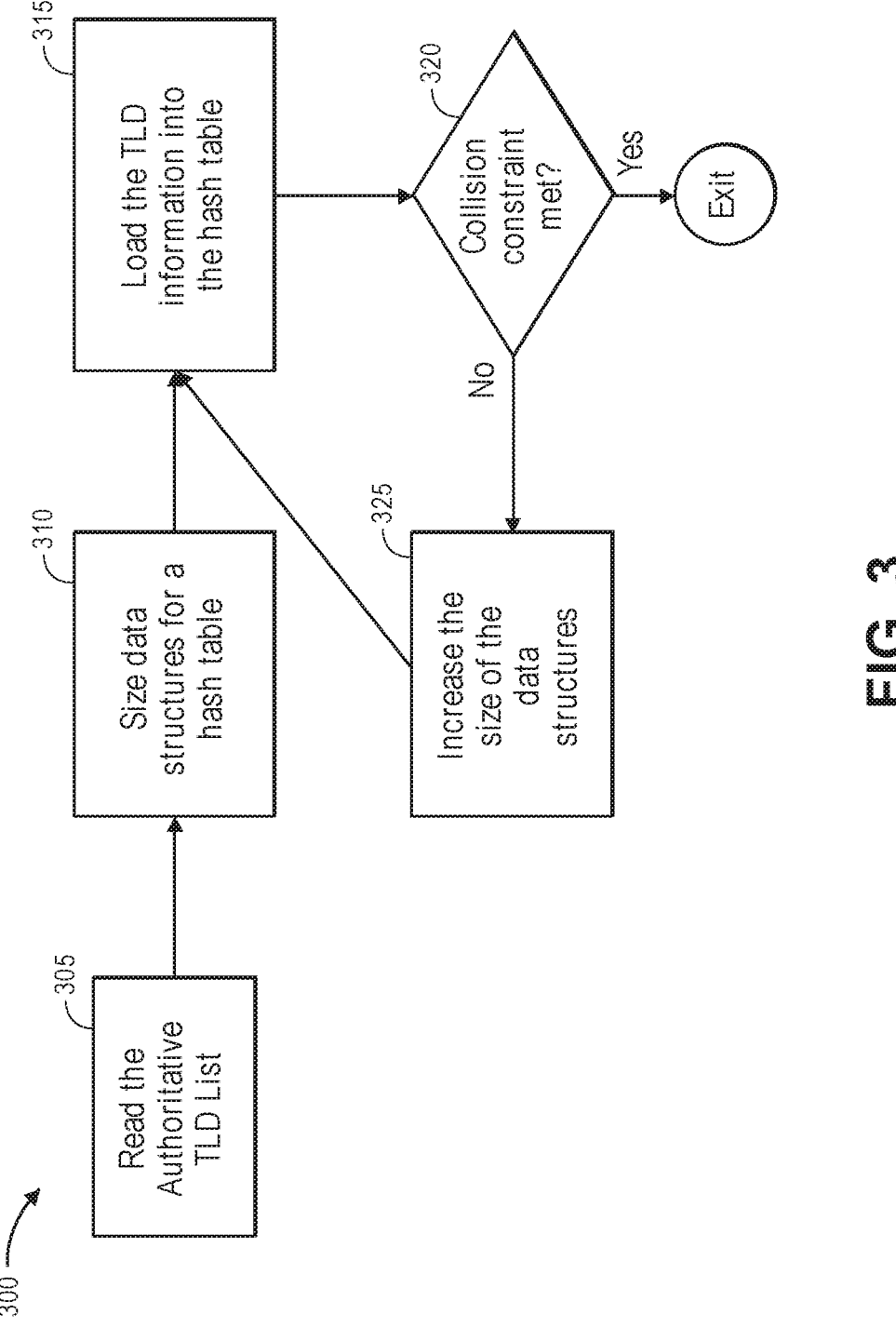
FIG. 3 is a flow diagram illustrating an example of a method for loading TLD information, consistent with certain disclosed embodiments.

FIG. 3 is a flow diagram 300 illustrating an example of an improved method for loading TLD information (e.g., step 205 in FIG. 2), consistent with certain disclosed embodiments. One or more steps in the method of FIG. 3 may be performed by the DNS server 120. The method may include the DNS server 120 reading TLD information from a TLD list, as at 305. As mentioned above, the TLD information may be or include a list of which TLDs for which the TLD server 120 is authoritative (e.g., "com", "net", and "edu"). The method may also include the DNS server 120 sizing data structures for a hash table that is configured to store the TLD information, as at 310. The hash table may begin with a minimum size of the data structures (e.g., 4 entries). The method may also include loading the TLD information into the hash table, as at 315.

The method may also include determining whether a predetermined (e.g., stored) collision constraint is met, as at 320. The hash table may include a plurality of buckets. There may be one or more entries in each bucket. Each entry may be or include a separate piece of TLD information (e.g., a different TLD for which the DNS server 120 is authoritative). Searching the hash table may be simplified (i.e., take less time compared to a conventional TLD information cache) because there are fewer entries in each bucket. Multiple entries in a single bucket is referred to as a collision. The data structures may be selected to have the smallest size that keeps hash collisions within the collision constraint. For example, if the collision constraint is zero, the DNS server 120 may determine whether the TLD information can be loaded into the data structures with no (e.g., zero) hash collisions. If, however, this determination or loading results in a hash collision (i.e., the collision constraint is not met), the DNS server 120 may iteratively increase the size of the data structures, as at 325, until the collision constraint is met or the maximum size of the data structures (e.g., 256 entries) is reached. The TLD information may be loaded into a contiguous array of TLD information objects to minimize the cache footprint. Once the collision constraint is satisfied, the method of FIG. 3 may conclude, and the method of FIG. 2 may then proceed to 210.

Determining whether the collision constraint is met, as at 320, is a technical improvement over the conventional systems and methods. More particularly, in the conventional way the TLD information was loaded, there were often collisions when the number of TLDs was large (e.g., 128). In addition, the conventional TLD data structure could occupy more cache footprint than required when the number of TLDs was very small (e.g., 3). The improved loading approach minimizes the cache footprint within a configured collision constraint. The lack of collisions and the small cache footprint reduce CPU consumption.

Figure 4:
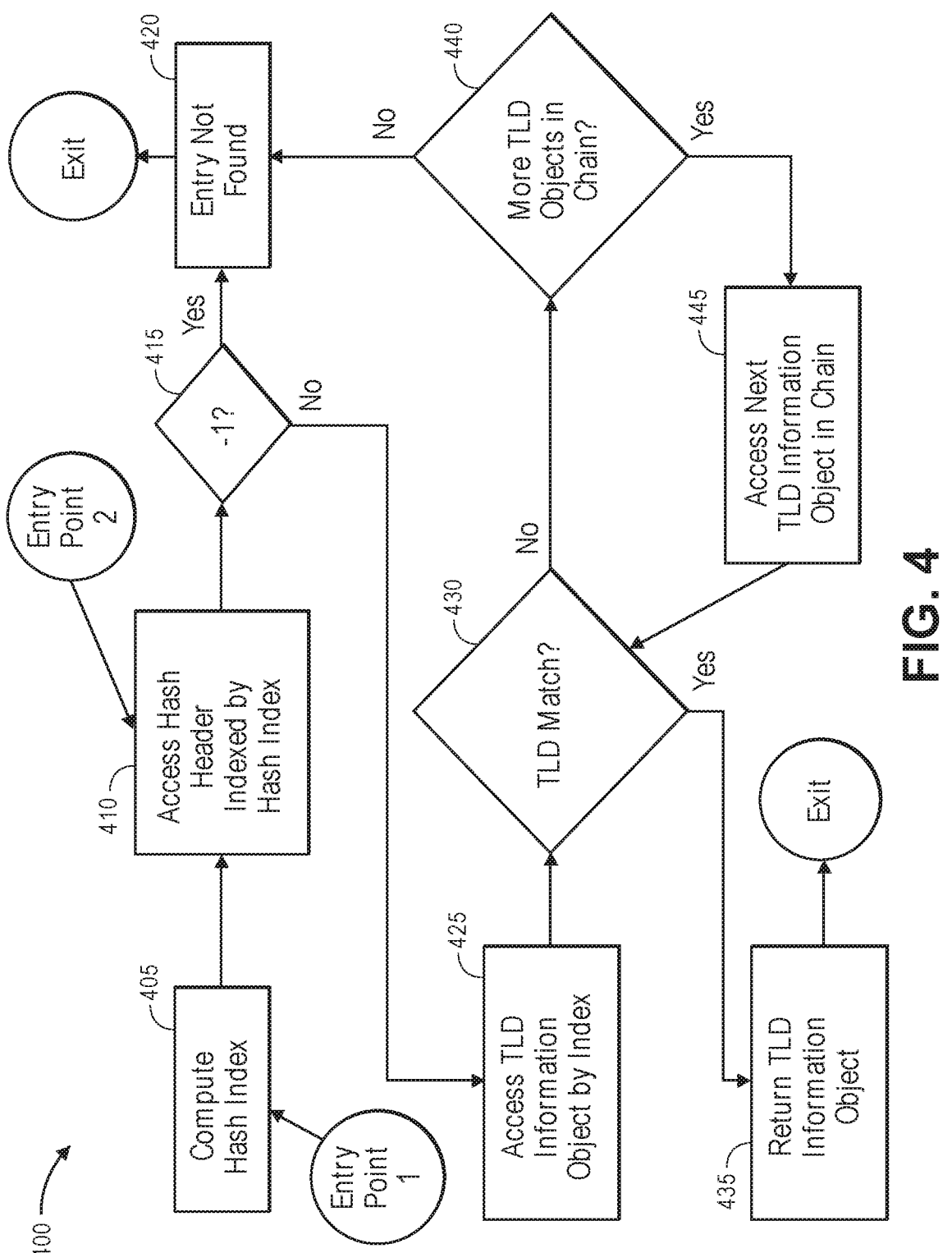
FIG. 4 is a flow diagram illustrating an example of a method for looking up a TLD, consistent with certain disclosed embodiments.

FIG. 4 is a flow diagram 400 illustrating an example of a method for looking up a TLD (e.g., step 220 in FIG. 2), consistent with certain disclosed embodiments. One or more steps in the method of FIG. 4 may be performed by the DNS server 120. The method may include computing a hash index, as at 405. In one example, the hash index may be computed by XORing each character of the TLD ANDed with hexadecimal 0x020 to make it case sensitive or case insensitive. The characters may be added to the hash in reverse order. The hash value modulo the size of the hash table is the hash index.

The method may also include the DNS server 120 accessing a hash header indexed by the hash index, as at 410. Unlike typical conventional hash headers that contain a pointer to a first entry in a linked list, the improved hash header used here may be a signed integer. For example, the hash header may have a value of −1 if there are no entries for the hash bucket or an index into the array of TLD information objects. A TLD information object is a data structure that contains information about a single TLD. TLD information, on the other hand, refers to either the information about a single TLD or information about a set of TLDs. In one example, TLD information may be stored in TLD information objects. The hash headers may be contiguous to minimize the cache footprint. The TLD information objects for a bucket may be linked into a list. The TLD information object may include a pointer to the next TLD information object for the hash bucket. In another embodiment, the TLD information object may include the index of the next TLD information object for the bucket rather than a pointer.

The method may also include determining whether the hash header matches the value used to indicate an empty hash bucket (e.g., −1), as at 415. If the header matches the empty-bucket value (i.e., YES), the DNS server 120 is not authoritative for the TLD. Thus, the DNS server 120 may determine that no entry is found, as at 420. The method of FIG. 4 may then conclude, and the method of FIG. 2 may proceed to 225.

If the header does not match the empty-bucket value (i.e., NO), the DNS server 120 may use the value to access the TLD information object array by index, as at 425. The TLD information object array may be in the TLD information cache 130. The method may then include determining whether the TLD information object returned matches the requested TLD, as at 430. If the TLD information object is for the requested TLD (i.e., YES), the TLD information cache 130 may return the TLD information object to the DNS server 120, as at 435. The method of FIG. 4 may then conclude, and the method of FIG. 2 may proceed to 225.

If the TLD information object is not for the requested TLD (i.e., NO), then the DNS server 120 may follow the linked list until the requested TLD is found or the end of the linked list is reached. More particularly, the method may include determining whether there are more TLD information objects in the chain, as at 440. If there are no more TLD information objects in the chain (i.e., NO), the DNS server 120 may determine that no entry is found, as at 420. The method of FIG. 4 may then conclude, and the method of FIG. 2 may proceed to 225. If additional TLD information objects are found in the chain, the method may include accessing a next TLD information object in the chain, as at 445. The method may then loop back to 430.

In at least one embodiment, the collision constraint may be greater than zero. Also, if the collision constraint is zero, and the maximum size of the hash table is reached, and there are still no collisions, the loading process completes, and collisions will exist. This may be more likely to occur as the number of TLDs increases.

Figure 5:
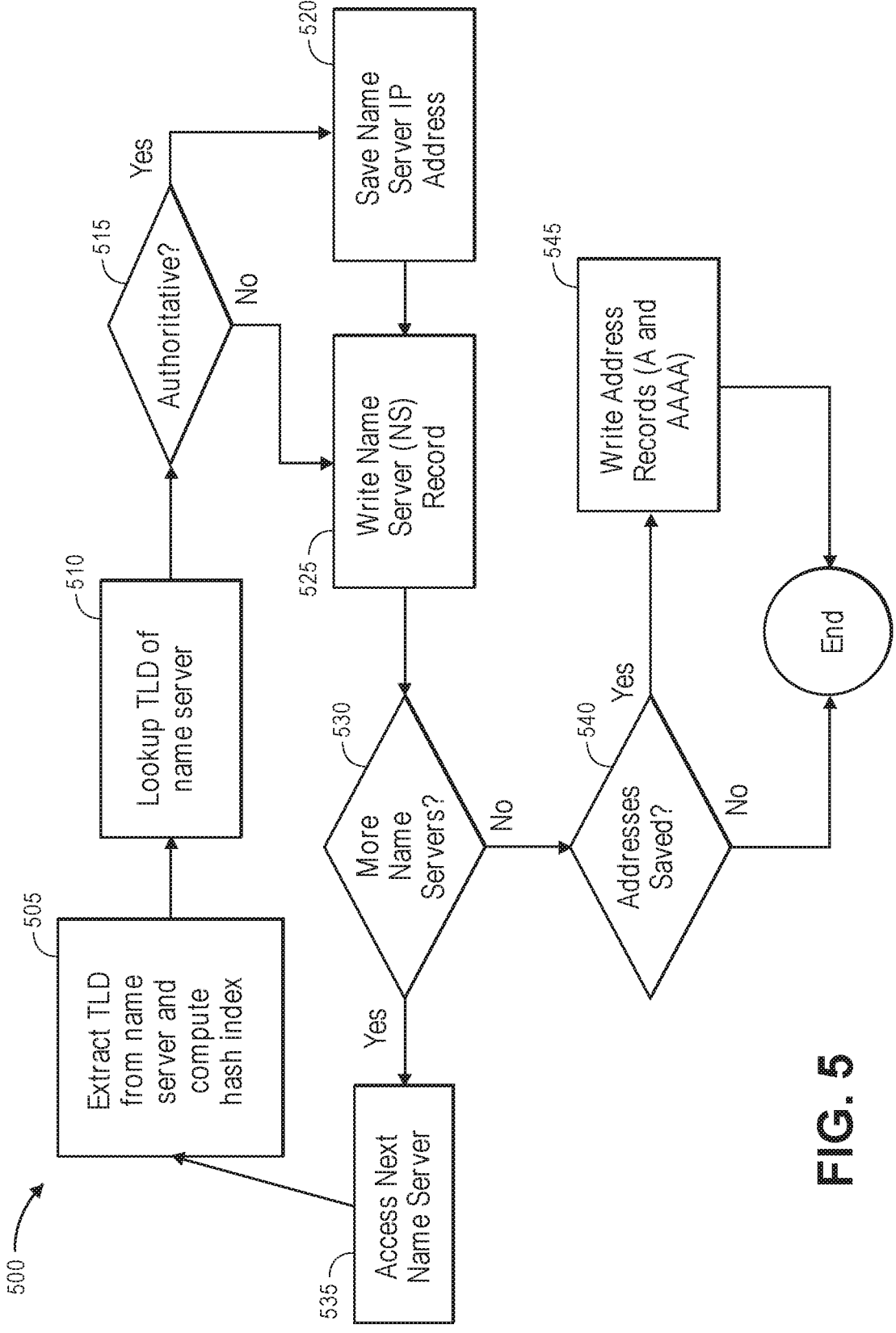
FIG. 5 is a flow diagram illustrating an example of a method for processing name server records, consistent with certain disclosed embodiments.

FIG. 5 is a flow diagram 500 illustrating an example of a method for processing NS records (e.g., step 235 in FIG. 2), consistent with certain disclosed embodiments. One or more steps in the method of FIG. 5 may be performed by the DNS server 120. The NS name may be obtained from the DNS database 140 in string format, for example, "ns1.example.com." To lookup the TLD for the NS, the TLD (e.g., com in this case) may be extracted from the NS name. The method may thus include extracting the TLD from the NS and computing a hash index, as at 505. The TLD may be extracted by examining the characters from the right until a delimiter "." is found. To maximize the speed, the hash index may be computed concurrently with extracting the TLD, using the same algorithm described earlier. This may result in a single pass over the characters.

The method may also include looking up the TLD of the NS, as at 510. The TLD may be looked up by returning to 410 in FIG. 4 (e.g., entry point 2), in which the hash index has already been computed. The lookup logic may be the same as previously described.

The method may also include determining if the DNS server 120 is authoritative for the TLD of the NS, as at 515. If the DNS server 120 is authoritative (i.e., YES), the method may include saving the NS Internet Protocol ("IP") address (e.g., for later inclusion in an A or AAAA address record in the additional section of the response), as at 520. If the DNS server 120 is not authoritative (i.e., NO), or once the NS IP address is saved, the method may include writing the NS record to the response to the client 110, as at 525. The method may then include determining whether an additional NS has been identified (e.g., at 230 in FIG. 2), as at 530. If an additional NS has been identified, the additional NS may be accessed, as at 535, and the method may loop back around to 505. If no additional NS has been identified, the method may include determining whether the address record of the NS (and additional NS if present) has been saved, as at 540. If the address record of the NS has not been saved, the method may include writing the address records of the NS to the response to the client 110 (e.g., to an additional section of the response), as at 545. The address records may be written as either of type "A" for IPv4 addresses or "AAAA" for IPv6 addresses. If/when the address is saved, the method of FIG. 5 may then conclude, and the method of FIG. 2 may proceed to 240 (e.g., sending the response to the client 110).

Figure 6:
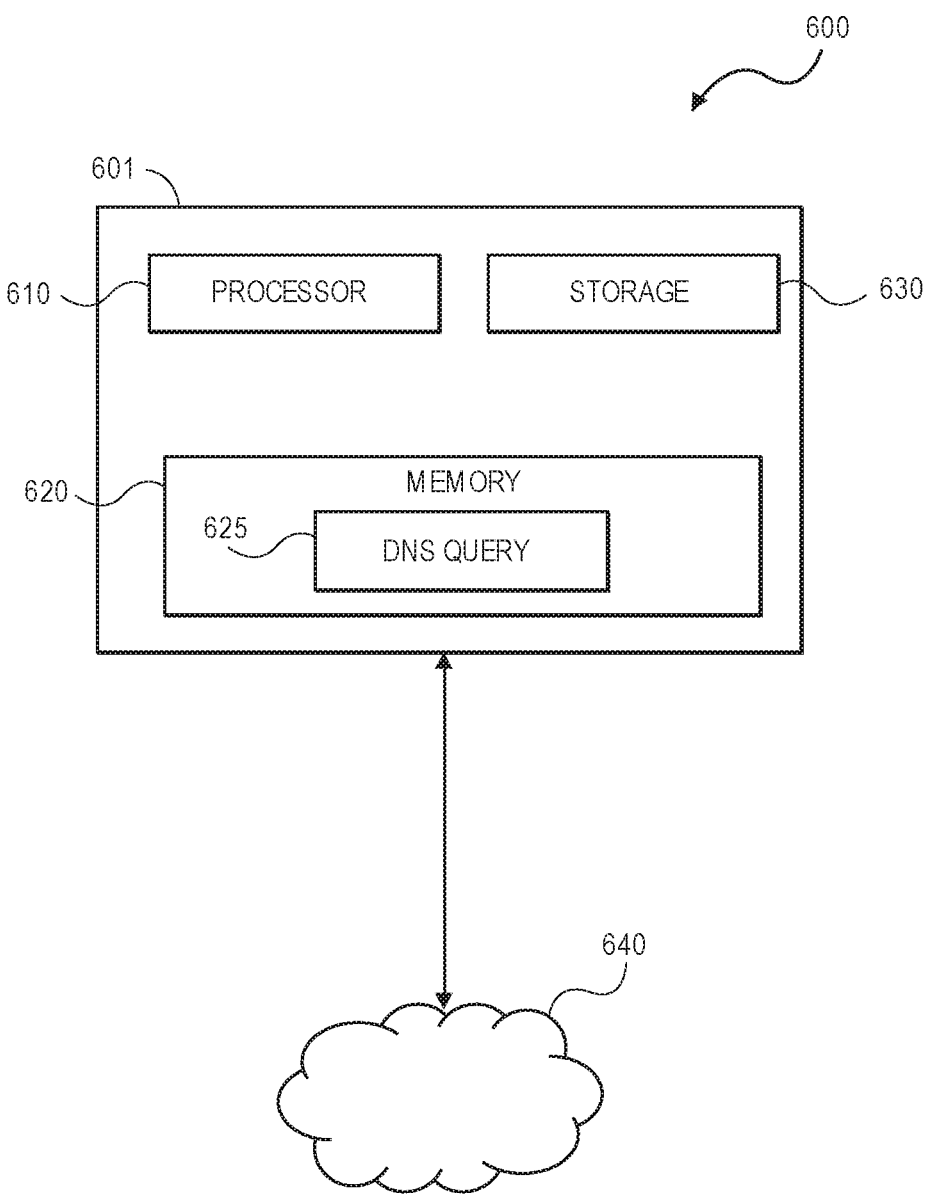
FIG. 6 is a diagram illustrating an example of a hardware system for performing at least a portion of one or more of the methods disclosed herein, consistent with certain disclosed embodiments.

FIG. 6 is a diagram illustrating an example of a hardware system 600 for performing at least a portion of one or more of the methods disclosed herein, consistent with certain disclosed embodiments. The example hardware system 600 includes example system components that may be used. The components and arrangement, however, may be varied.

The example hardware system 600 may include a computer 601. The computer 601 may include a processor 610, a memory 620, a storage 630, and input/output (I/O) devices (not pictured). The computer 601 may be implemented in various ways and can be configured to perform any of the embodiments described above. In some embodiments, the computer 601 can be a general purpose computer of an end user such as, for example, a desktop computer, a laptop, a tablet device, a mobile device (e.g., a smartphone), etc. In other embodiments, the computer 601 can be a computing device such as, for example, a data base server (e.g., a domain name registry), a web server, a mainframe computer, etc. For example, the computer 601 can be the DNS server 120 shown and described in FIG. 1. The computer 601 may be standalone or may be part of a subsystem, which may, in turn, be part of a larger system.

The processor 610 may include one or more known processing devices, such as a microprocessor from the Intel Core™ family manufactured by Intel™, the Phenom™ family manufactured by AMD™, or the like. The memory 620 may include one or more storage devices configured to store information and/or instructions used by the processor 610 to perform certain functions and operations related to the disclosed embodiments. The storage 630 may include a volatile or non-volatile, magnetic, semiconductor, tape, optical, removable, non-removable, or other type of computer-readable medium used as a storage device. In some embodiments, the storage 530 can include, for example, domain name records, DNS firewall customer IP addresses, and/or IP address blocks, etc.

In an embodiment, the memory 620 may include one or more programs or subprograms including instructions that may be loaded from the storage 630 or elsewhere that, when executed by the computer 601, perform various procedures, operations, or processes consistent with disclosed embodiments. For example, the memory 620 may include a DNS query program 625 for performing at least a portion of one of the methods 200, 300, 400, 500. The memory 620 may also include other programs that perform other functions, operations, and processes, such as programs that provide communication support, Internet access, etc. The DNS query program 625 may be embodied as a single program, or alternatively, may include multiple sub-programs that, when executed, operate together to perform the function of the DNS query program 625 according to disclosed embodiments.

The computer 601 may communicate over a link with a network 640 to, for example, the client 110, the TLD information cache 130, the DNS database 140, or a combination thereof. For example, the link may be a direct communication link, a local area network (LAN), a wide area network (WAN), or other suitable connection. The network 640 may include the internet, as well as other networks, which may be connected to various systems and devices.

The computer 601 may include one or more input/output (I/O) devices (not pictured) that allow data to be received and/or transmitted by the computer 601. The I/O devices may also include one or more digital and/or analog communication I/O devices that allow the computer 601 to communicate with other machines and devices. The I/O devices may also include input devices such as a keyboard or a mouse, and may include output devices such as a display or a printer. The computer 601 may receive data from external machines and devices and output data to external machines and devices via I/O devices. The configuration and number of input and/or output devices incorporated in I/O devices may vary as appropriate for various embodiments. Example uses of the hardware system 600 can be described by way of example with reference to the embodiments described above.

While the teachings has been described with reference to the example embodiments, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Furthermore, to the extent that the terms "including", "includes", "having", "has", "with", or variants thereof are used in either the detailed description and the claims, such terms are intended to be inclusive in a manner similar to the term "comprising." As used herein, the term "one or more of" with respect to a listing of items such as, for example, A and B, means A alone, B alone, or A and B. Those skilled in the art will recognize that these and other variations are possible within the spirit and scope as defined in the following claims and their equivalents.

What is claimed is:

1. A system comprising:

a processing system of a device comprising one or more processors; and a memory system comprising one or more computer-readable media, wherein the one or more computer-readable media contain instructions that, when executed by the processing system, cause the processing system to perform operations comprising:

reading, at a domain name system (DNS) server, top-level domain (TLD) information from a TLD list;

sizing data structures for a hash table;

loading the TLD information into the hash table, wherein the hash table comprises one or more buckets having one or more entries, wherein entries of the one or more entries each include TLD information;

determining whether a collision constraint is met in the hash table; and increasing a size of the data structures when the collision constraint is not met.

2. The system of claim 1, wherein the TLD information comprises a list of TLDs for which the DNS server is authoritative.

3. The system of claim 1, wherein sizing the data structures for the hash table comprises sizing the data structures for the hash table at a minimum size.

4. The system of claim 3, wherein the minimum size comprises 4 entries.

5. The system of claim 1, wherein increasing the size of the data structures comprises increasing the size of the data structures to have a smallest size that meets the collision constraint.

6. The system of claim 5, wherein the collision constraint is zero.

7. The system of claim 1, further comprising:

re-loading the TLD information into the hash table after the size of the data structures for the hash table has been increased; and determining whether the collision constraint is met in the hash table after the TLD information has been re-loaded into the hash table.

8. A system comprising:

a processing system of a device comprising one or more processors; and a memory system comprising one or more computer-readable media, wherein the one or more computer-readable media contain instructions that, when executed by the processing system, cause the processing system to perform operations comprising:

reading, at a domain name system (DNS) server, top-level domain (TLD) information from a TLD list;

sizing data structures for a hash table;

loading the TLD information into the hash table, wherein the hash table comprises one or more buckets having one or more entries, wherein entries of the one or more entries each include TLD information;

determining whether a collision constraint is met in the hash table;

increasing a size of the data structures when the collision constraint is not met;

receiving a query from a client for a DNS name after the size of the data structures has been increased;

looking up a TLD of the DNS name;

looking up DNS data for the DNS name when the TLD is found;

processing the DNS data to produce processed DNS data; and sending a response to the client including the processed DNS data.

9. The system of claim 8, wherein the TLD information comprises a list of TLDs for which the DNS server is authoritative.

10. The system of claim 8, wherein sizing the data structures for the hash table comprises sizing the data structures for the hash table at a minimum size.

11. The system of claim 10, wherein the minimum size comprises 4 entries.

12. The system of claim 8, wherein increasing the size of the data structures comprises increasing the size of the data structures to have a smallest size that meets the collision constraint.

13. The system of claim 12, wherein the collision constraint is zero.

14. The system of claim 8, further comprising:

re-loading the TLD information into the hash table after the size of the data structures for the hash table have been increased in size; and determining whether the collision constraint is met m the hash table after the TLD information has been re-loaded into the hash table.

15. The system of claim 8, wherein the DNS data comprises name server records.

16. The system of claim 8, wherein the processed DNS data comprises a list of name servers for the DNS name.

17. The system of claim 1, wherein the hash table comprises the plurality of data structures.

* * * * *